(12) United States Patent
Nucci et al.

(10) Patent No.: US 7,944,822 B1
(45) Date of Patent: May 17, 2011

(54) SYSTEM AND METHOD FOR IDENTIFYING NETWORK APPLICATIONS

(75) Inventors: Antonio Nucci, San Jose, CA (US); Ram Keralapura, Santa Clara, CA (US); Joshua Robinson, Mountain View, CA (US)

(73) Assignee: Narus, Inc., Sunnyvale, CA (US)

( * ) Notice: Subject to any disclaimer, the term of this patent is extended or adjusted under 35 U.S.C. 154(b) by 108 days.

(21) Appl. No.: 12/501,383

(22) Filed: Jul. 10, 2009

(51) Int. Cl.
*H04L 12/26* (2006.01)
(52) U.S. Cl. ...................................... 370/229
(58) Field of Classification Search .......... 370/229–235, 370/389, 392, 400, 401; 709/227–229, 238, 709/245
See application file for complete search history.

(56) References Cited

U.S. PATENT DOCUMENTS

| | | | | |
|---|---|---|---|---|
| 6,147,976 | A * | 11/2000 | Shand et al. ................. | 370/254 |
| 7,444,515 | B2 * | 10/2008 | Dharmapurikar et al. .... | 713/176 |
| 2003/0108042 | A1 * | 6/2003 | Skillicorn et al. ............ | 370/389 |

OTHER PUBLICATIONS

Iliofotou, M., et al., "Network Monitoring using Traffic Dispersion Graphs (TDGs)," in: Proceedings of the 7th ACM SIGCOMM Conference on Internet Measurement, (San Diego CA, Oct. 24-26, 2007), pp. 315-320.
Karagiannis, T., et al., "BLINC: Multilevel Traffic Classification in the Dark", in: Proceedings of the 2005 conference on Applications,Technologies, Architectures, and Protocols for Computer Communications (Philadelphia PA, Aug. 22-26, 2005), pp. 229-240.
Moore, A.W., et al., "Internet Traffic Classification Using Bayesian Analysis Techniques," in: Proceedings of the 2005 ACM SIGMETRICS International Conference on Measurement and Modeling of Computer Systems (Banff AB, Jun. 6-10, 2005), pp. 50-60.
Roughan, M., et al., "Class-of-Service Mapping for QoS: A Statistical Signature-based Approach to IP Traffic Classification," in: Proceedings of the 4th ACM SIGCOMM Conference on Internet Measurement (Taormina, Sicily, Oct. 25-27, 2004), pp. 135-148.

* cited by examiner

*Primary Examiner* — Dmitry H Levitan
(74) *Attorney, Agent, or Firm* — Fernandez & Associates, LLP

(57) ABSTRACT

Embodiments of the invention provide a framework for traffic classification that bridges the gap between the packet content inspection and the flow-based behavioral analysis techniques. In particular, IP packets and/or IP flows are used as an input, network nodes are associated to specific network applications by leveraging information gathered from the web, and packet-level and/or flow-level signatures are extracted in an off-line fashion using clustering and signature extraction algorithms. The signatures learned are systematically exported to a traffic classifier that uses the newly available signatures to classify applications on-the-fly.

18 Claims, 8 Drawing Sheets

SYSTEM AND METHOD FOR IDENTIFYING NETWORK APPLICATIONS

CROSS REFERENCE TO RELATED APPLICATIONS

This application is related to U.S. patent application Ser. No. 12/104,723 filed Apr. 17, 2008 and entitled "System and Method for Internet Endpoint Profiling," which is incorporated herein by reference.

BACKGROUND OF THE INVENTION

1. Field of the Invention

The present invention relates to computers and computer networks. More particularly, the invention relates to profiling Internet traffic flows to identify network applications responsible for the traffic flows.

2. Background of the Related Art

The evolution of the Internet in the last few years has been characterized by dramatic changes to the way users behave, interact and utilize the network. When coupled with the explosion of new applications sitting on the wire and the rising number of political, economic, and legal struggles over appropriate use of network bandwidth, it is easy to understand why now, more than ever, network operators are eager to posses a more precise and broader-in-scope information on which network applications are using their networks. The commercial world answered to this growing demand providing high-speed packet inspection appliances able to process up to 40 Gbps (gigabits per second) of traffic and supporting hundreds of packet content signatures. Still they appear to struggle in keeping up with the exponential rate at which new applications appear in the network. As a result, the attention of the research community has diverted to flow-based behavioral analysis techniques by applying sophisticated data mining algorithms that work on traffic flows (i.e., ignore packet content) to extract and analyze hidden properties of the traffic either in the forms of "social interaction" of hosts engaged in the communication or in the forms of "spatial-temporal analysis" of features such as flow duration, number and size of packets per flow, inter-packet arrival time. Apart from problems such as false positive and false negatives, these techniques are principally aimed at classifying a traffic flow with a broader application class (e.g., "P2P" (peer-to-peer) application class) rather than revealing the specific application (e.g., "P2P-KaZaA" of the many applications in the P2P application class) responsible for the traffic flow.

The demand for bandwidth management tools that optimize network performance and provide quality-of-service guarantees has increased substantially in recent years, in part, due to the phenomenal growth of bandwidth-hungry P2P applications. It is, therefore, not surprising that many network operators are interested in tools to manage traffic such that traffic critical to business or traffic with real-time constraints is given higher priority service on their network. Furthermore, security is becoming a challenging. Networks and institutions of any size are constantly being targeted with more and more sophisticated attacks. Critical for the success of any such tool is its ability to accurately, and in real-time, identify and categorize each network flow by the application responsible for the flow. Identifying network traffic using port numbers was the norm in the recent past. This approach was successful because many traditional applications use port numbers assigned by or registered with the Internet Assigned Numbers Authority (IANA). The accuracy of this approach, however, has been seriously reduced because of the evolution of applications that do not communicate on standardized ports. Many current generation P2P applications use ephemeral ports, and in some cases, use ports of well-known services such as Web and FTP to make them indistinguishable to the port-based classifier.

Techniques that rely on inspection of packet contents have been proposed to address the diminished effectiveness of port-based classification. These approaches attempt to determine whether or not a flow contains a characteristic signature of a known application. However, packet-inspection approaches face two severe limitations. First, these techniques only identify traffic for which signatures are available. Maintaining an up-to-date list of signatures is a daunting task. Information is rarely available, up-to-date or complete. Furthermore, the traditional ad-hoc growth of IP (i.e., Internet Protocol) networks, the continuing rapid proliferation of applications of different kinds, and the relative ease with which almost any user can add a new application to the traffic mix in the network with no centralized registration, are some factors contributing to this "knowledge gap". Second, packet inspection techniques only work if and only if full packets (i.e., header and payload) are available as an input and are completely ineffective when only coarser information at traffic flow level is available. Unfortunately, only a few service providers today have instrumented their networks with packet inspection appliances while the majority of them have access only to traffic flows extracted directly from the routers.

The web (or "World Wide Web") is a system of interlinked hypertext documents (i.e., web pages) accessed via the Internet using URLs (i.e., Universal Resource Locators) and IP addresses. The Internet is composed of machines (e.g., computers or other devices with Internet access) associated with IP addresses for identifying and communicating with each other on the Internet. The Internet, URL, and IP addresses are well known to those skilled in the art. The machines composing the Internet are called endpoints on the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts. In vast majority of scenarios, information about servers such as the IP address is publicly available for user to access. In peer-to-peer based communication, in which all endpoints can act both as clients or servers, the association between an end point and the P2P application becomes publicly visible. Even in the classical client-server communication scenario, information about clients such as website user access logs, forums, proxy logs, etc. also stay publicly available. Given that many forms of communication and various endpoint behaviors do get captured and archived, enormous amount of information valuable for profiling or characterizing endpoint behavior at a global scale is publicly available but has not been systematically utilized for such purpose.

SUMMARY

Generally speaking, embodiments of the invention provide a framework for traffic classification that bridges the gap between the packet content inspection and the flow-based behavioral analysis techniques. In particular, it is an objective of the invention to leverage the merits of the packet content inspection techniques by guaranteeing the high-accuracy in classifying application-specific traffic while providing the robustness to detect zero-day applications (i.e., newly developed without historically generated signatures) and the ability to work with both packet and flow characteristics of the flow-based behavioral analysis techniques. Embodiments of the invention takes IP packets and/or IP flows as an input, associates network nodes to specific network applications by leveraging information gathered from the web, and automatically extracts packet-level and/or flow-level signatures in an off-line fashion using clustering and signature extraction algorithms. The signatures learned are systematically exported to a traffic classifier that uses the newly available signatures to classify applications on-the-fly. Through this document, the terms "flow", "traffic flow", "network flow", and "network traffic flow" may be used interchangeably depending on the context. In addition, the term "application" and "network application" may be used interchangeably depending on the context.

It is another objective of the invention to not only work with flows (i.e., network traffic flows) as input data but also implement an extensible architecture to work with packets as input data thus providing solutions for a variety of different network configurations.

It is still another objective of the invention to identify the specific application responsible for an IP stream thus providing broader applicability to business and traffic engineering tasks compared to application-class techniques that does not identify to the specific application.

It is yet another objective of the invention to perform the classification in a purely automated and transparent fashion (i.e., no off-line training or human intervention required) even in the context of zero-day applications.

It is yet another objective of the invention to perform the classification in a highly accurate manner even over long-lasting time periods. It is achieved by (i) extracting the application signature based on server specific flows and packets associated with each individual application, (ii) leveraging the web as an extra source of information, and (iii) tracking changes between new signatures and old-signatures and to maintain the up-to-date signature-list.

It is yet another objective of the invention to maintain low evaluation overhead thus being practical for online traffic classification at very high speed links.

It is yet another objective of the invention to extract signatures that are robust to routing asymmetry (i.e., measurement point may capture only one direction of a bidirectional communication due to the prevalence of asymmetric routing in the Internet).

In general, in one aspect, the present invention relates to a method for profiling network traffic of a network. The method includes obtaining a first plurality of packet header records from a plurality of flows in the network traffic, extracting a first plurality of statistical features for each flow from the first plurality of packet header records to form a first server feature matrix of a first server associated with the first plurality of packet header records, determining, using a computer, a plurality of principal components of the first server feature matrix by factorizing the first server feature matrix using singular value decomposition, forming an application space based on the plurality of principal components, wherein the plurality of principal components are orthogonal unit vectors in the application space, identifying, using the computer, a signature of the first server based on a pattern of the first plurality of packet header records in the application space, wherein the signature is associated with a network application running on the first server, and determining, using the computer, a second server in the network as running the network application by analyzing a second plurality of packet header records associated with the second server in the network traffic based on the signature.

In general, in one aspect, the present invention relates to a computer readable medium storing instructions, when executed by the computer to profile network traffic of a network, the instructions include functionality for obtaining a first plurality of packet header records from a plurality of flows in the network traffic, extracting a first plurality of statistical features for each flow from the first plurality of packet header records to form a first server feature matrix of a first server associated with the first plurality of packet header records, determining, using a computer, a plurality of principal components of the first server feature matrix by factorizing the first server feature matrix using singular value decomposition, forming an application space based on the plurality of principal components, wherein the plurality of principal components are orthogonal unit vectors in the application space, identifying, using the computer, a signature of the first server based on a pattern of the first plurality of packet header records in the application space, wherein the signature is associated with a network application running on the first server, and determining, using the computer, a second server in the network as running the network application by analyzing a second plurality of packet header records associated with the second server in the network traffic based on the signature.

In general, in one aspect, the present invention relates to a system for profiling network traffic of a network. The system includes a statistical analyzer configured to extract a first plurality of statistical features for each flow from a first plurality of packet header records to form a first server feature matrix of a first server associated with the first plurality of packet header records, wherein the first plurality of packet header records are obtained from a plurality of flows in the network traffic, determine a plurality of principal components of the first server feature matrix by factorizing the first server feature matrix using singular value decomposition, and form an application space based on the plurality of principal components, wherein the plurality of principal components are orthogonal unit vectors in the application space. The system further includes a signature generator configured to identify a signature of the first server based on a pattern of the first plurality of packet header records in the application space, wherein the signature is associated with a network application running on the first server, and a processor and memory storing instructions when executed by the processor comprising functionalities to analyze a second plurality of packet header records in the network traffic based on the signature to generate a matching level, and determine a second server in the network as running the network application based on the matching level.

Other aspects and advantages of the invention will be apparent from the following description and the appended claims.

DETAILED DESCRIPTION

Figure 1:
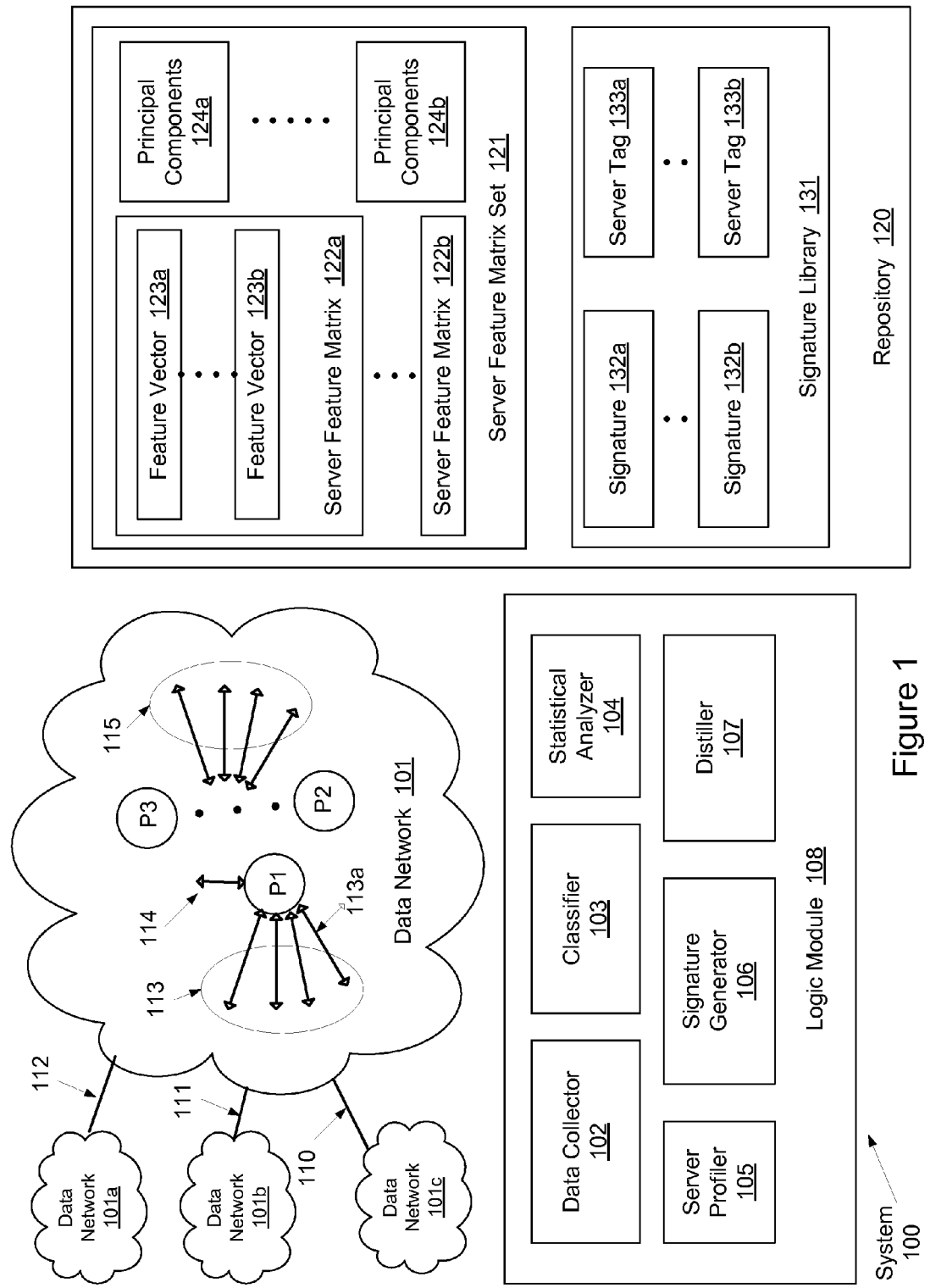
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally speaking, a traffic stream (or flow) between two network hosts is a series of data records regarding the communication between the two network hosts engaged in a Internet transaction. Each traffic stream is uniquely defined by a 5-tuple identifier (i.e., source address, destination address, source port, destination port, and transport protocol). Throughout this document, the terms "traffic flow", "flow", "traffic stream" and "stream" are used interchangeably.

When a data record of the traffic stream includes the entire packet (i.e., packet header and payload content), the traffic stream includes full packet visibility. Full packet visibility represents the finest level of information that can be collected for an Internet transaction.

From time to time, only information about packet headers (i.e., without payload content) can be collected for an Internet transaction. When a data record of the traffic stream includes only packet header, the traffic stream includes the traffic flow visibility only. Traffic flow visibility represents the second finest level of information that can be collected for an Internet transaction. In this case, an Internet transaction between two network hosts can only be partially reconstructed by grouping all packet headers with a common 5-tuple identifier (i.e., source address, destination address, source port, destination port, and transport protocol), while the fingerprint (at the packet payload level) of the application involved in such a transaction is lost.

In one or more embodiments of the invention, classifying an application with only traffic flow visibility is performed by leveraging statistical properties of the flow. Example of such statistics are average and standard deviation of packet sizes in the flow, or minimum, average, and maximum inter-arrival packet times in the flow, etc.

One way to collect traffic flows from the network is to leverage the router infrastructure. All routers today are capable to provide such information via protocols such as Netflow® (a registered trademark of Cisco Systems, Inc., San Jose, Calif.) or the equivalent JFlow® (a registered trademark of Juniper Networks, Inc., Sunnyvale, Calif.). Sampling techniques are often applied when routers are used to collect such information in order to reduce the amount of processing time required to carry over such a task. For example, Cisco routers are typically deployed with packet sampling rate 1:200 (or 1:1000), meaning that not all packet headers of a traffic flow are visible but only 1 out 200 packets of a flow (or 1 out of 1000 packets). Packet headers collected from a sampled version of a traffic flow is referred to as netflow-like records and the sampled version of the traffic stream includes the netflow-like record visibility only. Throughout this document, packet headers collected from non-sampled traffic flows or netflow-like records collected from sampled traffic flows are generally referred to as packet header records.

Although the general system architecture of embodiments of the invention remains the same independently of the type of traffic streams (e.g., full packets, packet headers, netflow-like records, etc.) being processed, the specific operations executed depend on the type of traffic stream. In the following, the details of system modules and methods are described considering packet header records (containing either packet headers or netflow-like records) as deployment scenarios. However, it is contemplated that the system and method may be applied to other full packet deployment scenarios or to operate in the context of heterogeneous deployment scenarios in which full packets may be obtained from specific parts of the network while packet header records may be obtained from other parts of the network.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

A shown in FIG. 1, the system (100) includes data networks (101, 101a, 101b, and 101c), a logic module (108), and a repository (120). Each of these networks may be a portion of a larger network and are shown to be coupled via links (110, 111, 112). The network (101) includes hosts (P1, P2, P3, etc.). As shown, host (P1) is associated with traffic streams (113) comprising packet header records (i.e., packet headers or netflow-like records) as well as a traffic stream (114) comprising full packets while hosts (P2, P3, etc.) are associated with traffic streams (115). The traffic streams (113, 114) are referred to as attached to the server (P1) while the traffic streams (113) include a particular stream (113a).

As shown in FIG. 1, the logic module (108) includes a data collector (102), a classifier (103), a statistical analyzer (104), a server profiler (105), a signature generator (106), and a distiller (107). The data collector (102), the classifier (103), and the statistical analyzer (104) may be referred to as a stream processor.

Further as shown in FIG. 1, the repository (120) includes a server matrix set (121) and a signature library (131). The server matrix set (121) further includes a number of server matrices (122a, 122b, etc.) corresponding to principal components (124a, 124b, etc.). The signature library (131) further includes signatures (132a, 132b, etc.) corresponding to server tags (133a, 133b, etc.). In one or more embodiments, signature library (131) may be implemented as a database, a file, a linked list, or other suitable data structures.

In one or more embodiments, the data collector (102) is configured to observe and collect, for example from links (110, 111, 112), information regarding traffic streams (e.g., packet headers/netflow-like records stream (113), full packets stream (114), etc.) when available while the classifier (103) is configured to filter and organize the collected traffic stream data regarding duplicate records or out-of-order records, and the statistical analyzer (104) is configured to extract statistics from the traffic streams (113, 114). Throughout this document, the phrase "collect the traffic streams" may be used to mean "collect information regarding traffic streams" depending on the context.

In one or more embodiments, the classifier (103) is further configured to classify the processed traffic streams in real time using a list of known signatures (e.g., 132a, 132b, etc.) in the signature library (131), previously extracted by the signature generator (106). When full packets (i.e., header+payload) are collected from the traffic stream (114), the classifier (103) uses packet-content signatures to classify the traffic stream (114). When packet header records (i.e., packet headers or netflow-like records) are collected from the traffic streams (113), the classifier (103) uses flow-feature signatures. Every traffic stream for which a signature is available is classified (i.e., assigned a classification) and promptly reported to the end-user (not shown). The classification may be associated (or tagged) with an application, which may be previously identified by the server profiler (105) or presently unknown yet to be identified. More details of identifying the application by the server profiler (105) are described later.

In one or more embodiments, when an unknown stream (i.e., a stream for which a signature is not available in the signature library (131)) is observed, the classifier (103) forwards a summary of the unknown stream to the statistical analyzer (104). Throughout this document, this "summary of the traffic stream" may be referred to as "informational block." The composition of the information block depends on the nature of the traffic stream being processed. When packet headers or netflow-like records are received from the input stream (113), the informational block is generated by extracting fundamental statistics from the stream (113). The details of such statistics are described later. Conversely, when full packets are received in the input stream (114), the information block is generated by extracting the top B bytes of the first N packets from the stream (114) after duplicate packets have been removed and the remaining packets properly re-ordered. Informational blocks of unclassified traffic streams (113, 114) are then passed to the statistical analyzer (104).

In one or more embodiments, the statistical analyzer (104) is configured to perform two main tasks described below. For example, the tasks may be performed on a periodic basis, i.e., over a recurring time window $T_w$ where the index w represents a time point sequence starting from an arbitrary value (e.g., 0) and the period T may be a constant value (e.g., 1 second, 1 minute, 1 hours, 1 day, or any other suitable time periods) throughout the time point sequence or a variable value that is different for different time point in the sequence. AN example of the time point sequence is $T_0, T_1, \ldots T_{w-1}, T_w$. Throughout this document, depending on the context, the term "$T_w$" may refer to a time point in the time point sequence or the time window starting from the time point.

In one or more embodiments, the statistical analyzer (104) is configured to identify the functional role (i.e., client versus server) of the most recurrent IP addresses being observed in streams (113, 114, 115), for example during each time window $T_w$. In one or more embodiments, this is accomplished by tracking the cumulative number of flows being destined to each IP address and sorting the ratio of such cumulative number of flows divided by the total amount of traffic being observed. At the end of the time window $T_w$, the statistical analyzer (104) identifies the top P IP addresses contributing to the majority of traffic observed in the current time window $T_w$ as the server IP addresses referred to as $P(T_w)=\{p_1, p_2, \ldots, p_p\}(T_w)$. For example, $P(T_w)$ may include P1 and P2.

In one or more embodiments, the statistical analyzer (104) is configured to exclude the top P server IP addresses $P(T_{w-1})=\{p_1, p_2, \ldots, p_p\}(T_{w-1})$ observed in the previous time window $T_{w-1}$ when identifying $P(T_w)=\{p_1, p_2, \ldots, p_p\}(T_w)$ such that $P(T_w) \cap P(T_{w-1})=\{0\}$ in order to eliminate processing duplicate servers in adjacent time windows. For example, $P(T_{w-1})$ may include P3, which is excluded when identifying $P(T_w)$. In one or more embodiments, the statistical analyzer (104) is configured to exclude the top P server IP addresses $P(T_{w-1})=\{p_1, p_2, \ldots, p_p\}(T_{w-1})$ observed in X number of previous time windows (e.g., $T_{w-x}$ through $T_{w-1}$) when identifying $P(T_w)=\{p_1, p_2, \ldots, p_p\}(T_w)$ such that $P(T_w) \cap P(T_{w-i})=\{0\}$ for $i\epsilon\{1 \ldots X\}$ in order to eliminate processing duplicate servers in adjacent time windows. For example, $P(T_{w-x})$ may include P3, which is excluded when identifying P(Tw).

As will be discussed later, the server profiler (105) is configured to identify applications running on the top P servers. However, a server that cannot be identified (i.e., server tag=unknown) during some time window may become identifiable in a later time window (e.g., few days later) in case an Internet user post something available on the Internet regarding this server. Thus, in the embodiments described above, the system has a short memory of X time windows. In other words, the system excludes all servers considered in the previous X time windows and when the short memory period expires, the unidentified servers are considered in the statistical analysis again.

In one or more embodiments, the statistical analyzer (104) is configured to generate the statistics associated with the set $P(T_w)$ during $T_w$ by processing M streams attached to each server $p_i$ in $P(T_w)$. Throughout this document, the terms "statistics", "parameters", "statistical parameter", "statistical feature" may be used interchangeably depending on the context. In one or more embodiments, the statistics are formatted as feature vectors (e.g., 123a, 123b, etc.). For example, the feature vectors (123a, 123b) may be extracted from streams (113) attached to the server P1. More details of generating the feature vectors are described later in reference to FIG. 2A.

In one or more embodiments, for each server $p_i$ (e.g., P1, P2) in $P(T_w)$ the statistical analyzer (104) is configured to create a server feature matrix $A(p_i)(T_w)$ (e.g., 122a, 122b) and to organize all these matrices into a server feature matrix set (e.g., 121) represented as $A(T_w)=\{A(p_1), A(p_2), \ldots A(p_p)\}$ $(T_w)$ with $i\epsilon\{1 \ldots p\}$. In one or more embodiments, server feature matrix $A(p_i)(T_w)$ is constructed using feature vectors of the server $p_i$ as row vectors of the matrix. For example, the server feature matrix (122a) may be $A(P1)(T_w)$, which includes feature vectors (123a, 123b) as row vectors. The dimensions of each of these matrices depends on the composition of the informational block being used to process streams associated with the respective server $p_i$. Although not specifically shown in FIG. 1, the repository (120) may include another server feature matrix set, for example created during another time window $T_{w-1}$ and represented as $A(T_{w-1})=\{A(p_1), A(p_2), \ldots A(p_p)\}(T_{w-1})$.

In one or more embodiments, when packet headers or netflow-like records are used, each matrix $A(p_i)$ is of size M times S where M represents the number of streams, collected during a time window, attached to the server $p_i$ and S represents the number of statistics extracted from each stream. In one or more embodiments, when full packets are used, each matrix $A(p_i)$ is of size M times B times N where N represents the first number of packets extracted per stream and B represents the first number of bytes extracted per packet. Although not specifically shown, each of S, M, B, and N may have different values for different time windows or different servers. In the remainder of this document, the description is focused on embodiments with streams including the packet headers or netflow-like records while each matrix $A(p_i)(T_w)$ is of size M times S. Throughout this document, the matrix $A(p_i)(T_w)$ may be referred to as $A(p_i)$ where the omitted $T_w$ is implied as the particular time window when the matrix is created.

In one or more embodiments, the statistical analyzer (104) is configured to generate principal components (e.g., 124a, 124b, etc.) from server feature matrices (e.g., 122a, 122b, etc.) based on principal components analysis. More details of generating the principal components are described later in reference to FIG. 2A.

In one or more embodiments, the server profiler (105) searches the web for semantic information associated with a server IP address so as to automatically map a server IP address to a specific application that is responsible for the server attached streams without requiring pre-knowledge or off-line training or other human intervention. The server $p_i$ of the IP address is referred to as being tagged (using a server tag) with this specific application. Similarly, a signature associated with the server $p_i$ is referred to as being tagged with this specific application. Accordingly, traffic flows determined to match the tagged signature can be classified as being generated by this specific application. More details of the server profiler (105) are described in the related U.S. patent application Ser. No. 12/104,723 filed Apr. 17, 2008 and entitled "System and Method for Internet Endpoint Profiling." More details of determining traffic flows as matching a signature are described later.

As an example, traffic streams (113, 114) attached to the server P1 may be tagged with the server tag (133*a*) generated by the server profiler (105) that identifies the application running on the server P1. Accordingly, the signature (132*a*) generated from the traffic streams (113, 114) by the signature generator (106) is tagged with the server tag (133*a*). In one or more embodiments, an association between the server tag (e.g., 133*a*) and the tagged signature (e.g., 132*a*) is stored in the signature library. In one or more embodiments, when the server profiler (105) fail to identify the application running on the server $p_i$, an unknown server tag is associated with the signature (e.g., 132*a*) of the server $p_i$ and is stored in the signature library. As discussed above, the server $p_i$ may be analyzed again in a later time window. More details of using the server profiler (105) to generate server tags are described in the related U.S. patent application Ser. No. 12/104,723 filed Apr. 17, 2008 and entitled "System and Method for Internet Endpoint Profiling," which is incorporated herein by reference.

In one or more embodiments, the signature generator (106) is configured to, at the end of each time window $T_w$, receive the server feature matrix set (121) $A(T_w) = \{A(p_1), A(p_2), \ldots A(p_p)\}(T_w)$ from the stream processor. For example, the server feature matrix set (121) may be stored in the repository (120) by the stream processor and subsequently retrieved by the signature generator (106). As discussed above, in embodiments with flows including packet headers or netflow-like records, each matrix $A(p_i)(T_w)$ is of size M times S. In such embodiments, the signature generator (106) processes each $A(p_i)(T_w)$ matrix separately in search for commonality or strong similarity of statistical features across the M flows in the matrix.

In one or more embodiments, the signature generator (106) is configured to normalize each matrix $A(p_i)(T_w)$, for example to enhance the influence of statistical features with low variance among streams and reduce the influence of statistical features with high variance among streams. Further, the signature generator (106) is configured to apply a Singular Value Decomposition (SVD) algorithm (described in more detail later) the matrix $A(p_i)(T_w)$ to generate a flow-feature signature of the server $p_i$. In particular, the signature generator (106) is configured to generate each flow-feature signature based only on streams attached to an individual server such that the flow-feature signature is specific to the application running the server responsible for the M flows in the server feature matrix. For example, the application may be an unknown application to be identified later or a known application tagged to the server by the server profiler (105). As discussed above, in one or more embodiments, the correlation between the application and the tagged signature is stored in the signature library.

In one or more embodiments, signatures (132*a*, 132*b*, etc.) are flow-feature signatures. In one or more embodiments, the signature library (131) contains a complete and up-to-date list of all flow-feature signatures generated by the signature generator (106) up to time $T_w$ for use by the classifier (103) during the time window $T_w$.

Generally speaking, new versions of an application may be released over time causing flow-feature signatures associated with older versions to be un-applicable over time. In one or more embodiments, the distiller (107) is configured to expire (e.g., delete from the signature library (131)) flow-feature signatures based on a specified length of inactivity such that the current list of flow-feature signatures stored in the signature library (131) is ensured to be accurate and concise.

Further, one application may be mapped to several flow-feature signatures. For example, different versions of the same application may have similar flow-feature signatures with slight differences among them. In one or more embodiments, the distiller (107) is configured to identify such applications and consolidate similar flow-feature signatures.

Furthermore, over time the number of flow-feature signatures may grow to be extremely large, thus leading to overlapping flow-feature signatures. In one or more embodiments, the distiller (107) is configured to identify and consolidate such overlapping flow-feature signatures.

Figure 2A:
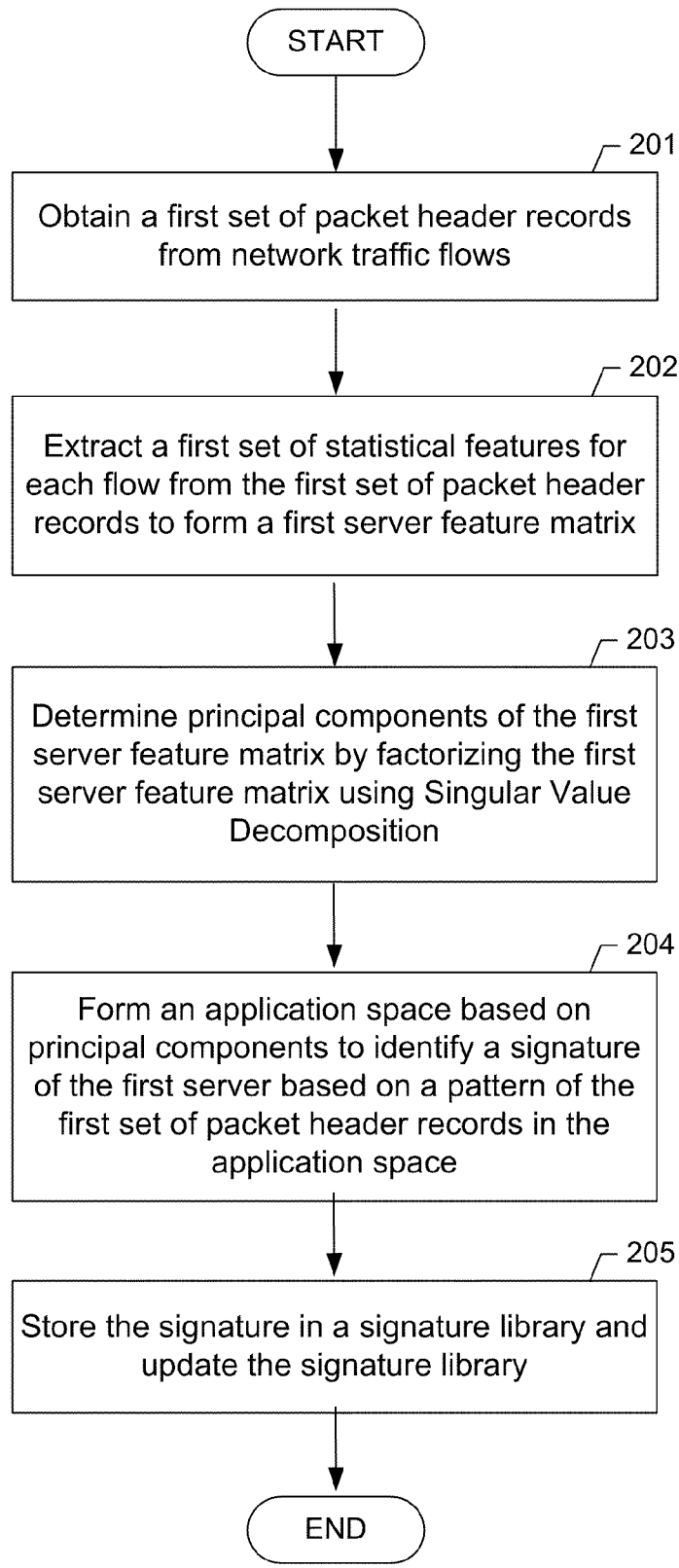
FIGS. 2A and 2B show flowcharts of a method according to aspects of the invention.
Figure 2B:
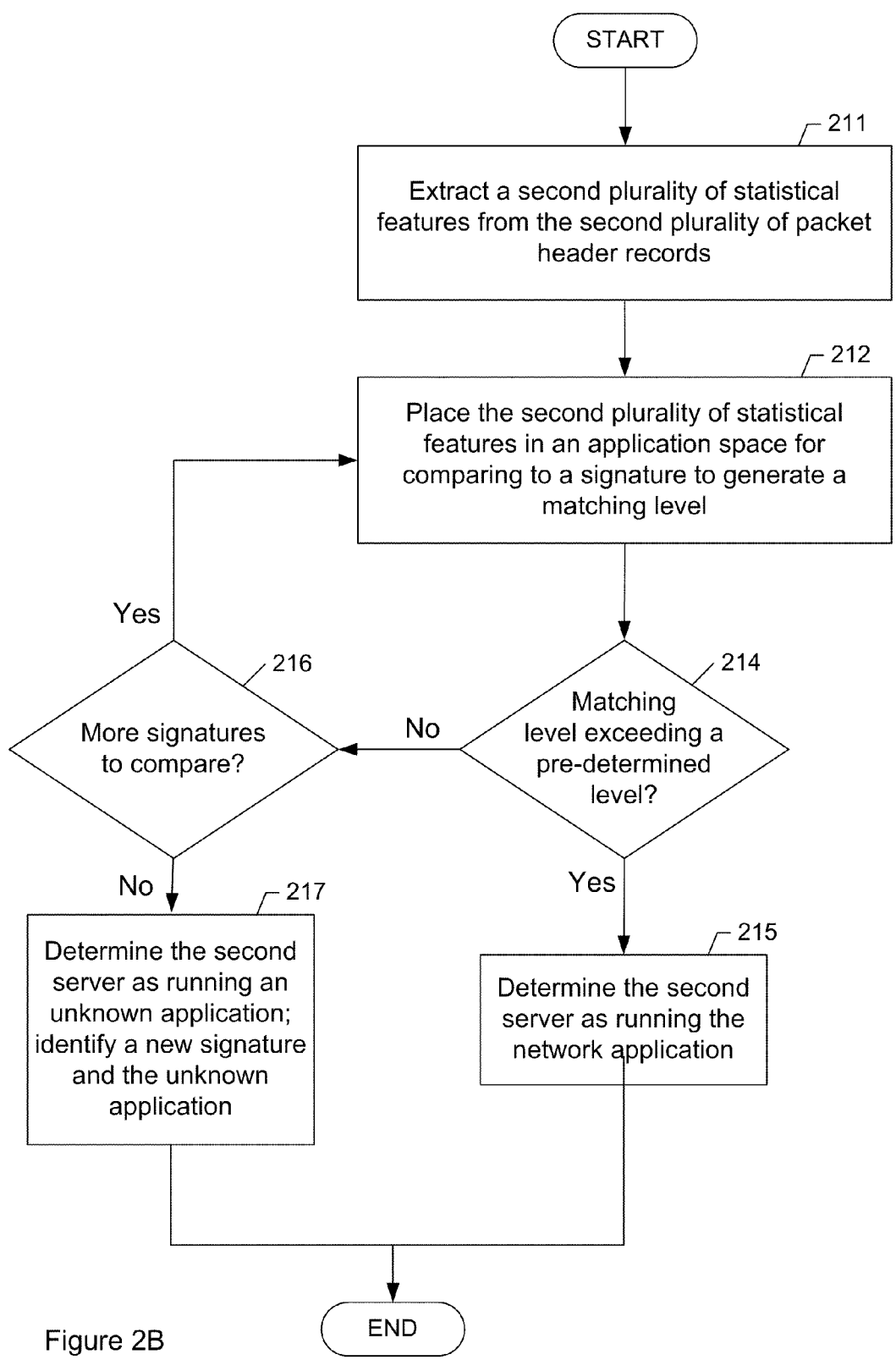

FIGS. 2A and 2B depict a flowchart of a method in accordance with one or more embodiments of the invention. In one or more embodiments of the invention, one or more of the steps shown in FIGS. 2A and 2B may be omitted, repeated, and/or performed in a different order. Accordingly, embodiments of the invention should not be considered limited to the specific arrangements of steps shown in FIGS. 2A and 2B. In one or more embodiments of the invention, the method depicted in FIGS. 2A and 2B may be practiced using system (100) described with respect to FIG. 1 above.

In particular, FIG. 2A depicts the method for generating signatures, for example using the signature generator (106) to be stored in the signature library (131) as described in reference to FIG. 1 above. FIG. 2B depicts the method for identifying traffic flows based on such signatures, for example by the classifier (103) as described in reference to FIG. 1 above. In one or more embodiments of the invention, the methods depicted in FIGS. 2A and 2B may be pipelined such that the classification of traffic flows in time window $T_w$ based on signatures generated in previous time windows (e.g., $T_{w-1}$) may be performed in parallel with identifying new servers in time window $T_w$ not present in previous time windows (e.g., $T_{w-1}$) and generating new signatures associated with such new servers.

Regarding FIG. 2A, in Step 201, a first set of packet header records are obtained from network traffic flows. For example, the packet header records and network traffic streams (e.g., (113) of FIG. 1) may be obtained by the classifier (103) during one (referred to as $T_w$) of a sequence of time windows as described in reference to FIG. 1 above. In an example, the network traffic flow may be a sampled flow and the packet headers obtained from the sampled flow are referred to as netflow-like records. As discussed in reference to FIG. 1 above, packet headers obtained from un-sampled flows and netflow-like records obtained from sampled flows are both referred to as packet header records.

In one or more embodiments, the first set of packet header records are reordered and reassembled into un-fragmented and in-order traffic flows for further processing. For example, a queue engine may be used to store incoming packet headers in a packet memory controlled by a link list controller. Accordingly, a packet assembler may be used to extract information from each packet header to determine if the packet header is fragmented or out-of-order. If the packet header is determined to be out-of-order, the queue engine may use a reordering unit to modify links with the link list controller to reorder the packet header. A fragment reassembly unit may also be used to reassemble fragments into complete un-fragmented packet headers.

In one or more embodiments, a server (referred to as the first server, e.g., P1 of FIG. 1) is identified from the network traffic streams (e.g., 113, 114, and 115 of FIG. 1) and is attached with streams (e.g., 113) containing the first set of packet header records. For example as described in reference to FIG. 1 above, the first server may be identified by the classifier (103) based on the top P IP addresses $P(T_w)=\{p_1, p_2, \ldots, p_p\}(T_w)$ contributing to the majority of traffic observed in the time window $T_w$ where $P1 \epsilon P(T_w)$.

Specifically in such embodiments, an IP address is identified by analyzing a set of data packets in the network traffic streams (e.g., 113, 114, and 115 of FIG. 1) to evaluate percentage occurrences in destination IP address fields in the set of data packets. In one embodiment, P1 is identified as the first server when such percentage occurrences associated with the IP address of P1 exceeds a pre-determined threshold. For example, the IP address of P1 may be among the top P IP addresses occurring in the destination IP address fields in the set of data packets. Accordingly, the first set of packet header records may be extracted from the set of data packets based on the IP address of the first server, for example from the streams (113).

In Step 202, a first set of statistical features for a particular stream (e.g., 113a) is extracted from the first set of packet header records to be included when forming a first server feature matrix of the first server P1. For example, the first set of statistical features may be the informational block described in reference to FIG. 1 above. In another example, the informational block may be in an intermediate format from which the first set of statistical features may be extracted. In one or more embodiments, the first set of statistical features is extracted from re-ordered/reconstructed flow of the first set of packet header records. In one or more embodiments, the first set of statistical features may include parameters listed below, which are elements forming the feature vector described in reference to FIG. 1 above. For example, the first set of statistical features may be in the form of a feature vector of the particular stream (e.g., 113a).

(1) Layer-4 Protocol (TCP/UDP)
(2) Source Port
(3) Destination Port
(4) Number of Packets
(5) Number of Transferred Bytes
(6) Number of Packets without Layer-4 (TCP/UDP) Payload
(7) Number of Packets with at least one Byte of TCP data payload
(8) Duration
(9) Average Packet Throughput
(10) Average Byte Throughput
(11-14) Max, Min, Average and Standard Deviation of Packet Sizes
(15-18) Max, Min, Average and Standard Deviation of Inter-Arrival Times (IATs)
(19-26) Number of TCP Packets with flags set (FIN, SYN, RSTS, PUSH, ACK, URG, CWE, ECE)
(27-36) Sizes of the first 10 Packets
(37) Number of Bytes sent in the initial window (before receiving first ACK packet)

Based on the list above, the feature vectors may be formatted as vectors of size S (e.g., 37), where S represents the number of statistical feature parameters (e.g., the 37 parameters listed above) extracted from the stream (e.g., 113a).

In one or more embodiments, multiple sets of statistical features (e.g., feature vectors) are extracted from each of M streams (e.g., 113) attached to the first server (e.g., P1) obtained during the time window $T_w$ and are organized into a multi-dimensional matrix, for example of M feature vectors each containing S elements. This multi-dimensional matrix is referred to as the server feature matrix of the server (e.g., P1).

In one or more embodiments, the server IP address is automatically mapped (or tagged) to a known application that is responsible for the attached streams (e.g., 113). For example, the server IP address may be automatically mapped by the server profiler (105) described in reference to FIG. 1 above. More details of the server tagging are described in the related U.S. patent application Ser. No. 12/104,723 filed Apr. 17, 2008 and entitled "System and Method for Internet Endpoint Profiling," which is incorporated herein by reference.

Accordingly, in embodiments described above, the first server with associated server feature matrix as well as a tagged known application may be identified and generated from the network traffic flows during the time window $T_w$.

Generally speaking, dominant features in the server feature matrix may be considerably different for different applications running on different servers. For example, a voice application may be running on the server (P1 of FIG. 1) and the dominant statistical features may be average packet size and inter-packet arrival time, whereas a P2P application may be running on the server (P2 of FIG. 1) and the dominant feature may be the number of incoming/outgoing connections. In one or more embodiments, these dominant features are quantified and used for distinguishing applications from each other.

In Step 203, principal components of the first server feature matrix are determined by factorizing the first server feature matrix using Singular Value Decomposition (SVD).

In one or more embodiments, at the end of every time window $T_w$, a server feature matrix is generated for each identified server in the set of servers $P(T_i)=\{p_1, p_2, \ldots, p_p\}(T_i)$ to form a server feature matrix set $A(T_w)=\{A(p_1), A(p_2), \ldots A(p_p)\}(T_w)$. For example, the first server feature matrix A(P1) may be generated for the first server P1. As discussed above, each matrix $A(p_i)$ may be formatted as M rows each containing S parameters where M represents the number of all the flows obtained during time window $T_w$ as attached to the server $p_i$ and S represents the number of statistical feature parameters extracted from each flow. Each column of such formatted matrix $A(p_i)$ is associated with one of the S parameters and is referred to as a statistical feature column.

Generally speaking, the mean and different standard deviation of a statistical feature column in $A(p_i)(T_w)$ may be different than those of another statistical feature column in $A(p_i)(T_w)$. In one or more embodiments, each matrix $A(p_i)(T_w)$ is normalized for enhancing the influence of statistical feature columns with smaller variances among the M flows and reducing the influence of statistical feature columns with higher variances among the M flows. In one or more embodiments, each element $a_{jk}$ of $A(p_i)(T_w)$ is normalized to become $a''_{jk}$ in the normalized matrix $A''(p_i)(T_w)$ based on $a''_{jk}=(a_{jk}-\mu_k)/\sigma_k$ where $\mu_k$ and $\sigma_k$ are the mean and standard deviation of $k^{th}$ statistical feature column in $A(p_i)(T_w)$. One skilled in the art will recognize that a statistical feature column with lower standard deviation is now emphasized more than a statistical feature column with higher standard deviation.

In one or more embodiments, the normalized server feature matrix $A''(p_i)(T_w)$ is factorized based on $A''(p_i)(T_w)=U*L*V^T$ where R is the rank of the matrix $A''(p_i)(T_w)$; U is a M*R matrix consisting of left singular vectors; L is a R*R matrix of non-zero singular values (ordered from the largest to smallest values) arranged diagonally; and V is a S*R matrix consisting of right singular vectors. Both U and V matrices include orthogonal unit vectors. The SVD factorization is known to those skilled in the art and represents an expansion of the original matrix $A''(p_i)(T_w)$ in a coordinate system where the covariance matrix is diagonal. Furthermore, the columns of the V matrix can be considered as the bases in the new coordinate system. Each column in the V matrix is a linear combination of the statistical feature parameters (e.g., the 37 parameters described above) in the original matrix $A(p_i)(T_w)$ and is referred to as a principal component (or PC). The first principal component (or PC-1) represented by the first column of the matrix V represents the direction of maximum variance in the original space. Similarly, PC-2 represents the direction of second largest variance and is orthogonal to PC-1 in the original space, and so on and so forth. This new coordinate system is referred to as the principal component space (or the application space) for the application (whether, during $T_w$, unknown to be identified later or already identified) running on the first server P1.

As is known in the art, one application of the SVD factorization is in reduction of dimensionality. Generally speaking, the original matrix can be reconstructed using only a portion of all principal components. In other words, depending on the singular values in the matrix L, a subset of all PCs can capture most of the contents of the original matrix $A''(p_i)(T_w)$. For example, the content of a matrix X may be represented by the energy of the matrix defined as $X*X^T$. A threshold (e.g., 0.95, or 95%) may be defined to represent the fraction of contents of the original matrix $A''(p_i)(T_w)$ required to be reconstructed in order for the subset of all PCs to be considered as capturing a satisfactory copy of the original matrix $A''(p_i)(T_w)$. In one or more embodiments, a number K is determined as the number of PCs (from PC-1 to PC-K) required to satisfactorily reconstructing the original matrix $A''(p_i)(T_w)$ based on the predetermined threshold.

In Step 204, an application space is formed based on the principal components as orthogonal unit vectors in the application space. For example, K PCS (from PC-1 to PC-K) determined above may be used to form the application space for the first server P1. The server feature matrix used to form such application space is referred to as the originating server feature matrix of the application space.

In one or more embodiments, a signature of the first server P1 may be generated based on a pattern of the first set of packet header records in the application space, where the signature is associated with a network application running on the first server. For example, entries (i.e., feature vectors of the M flows or elements $a''_{jk}$) of the first server feature matrix may be placed in the application space to form the pattern of the first set of packet header records from which the normalized server feature matrix $A''(p_i)(T_w)$ is generated. In addition, a centroid and a standard deviation may be determined for the entries of the first server feature matrix placed in the application space. Each placed entry is referred to as representing a corresponding flow, from which the entry is generated, in the application space. In one or more embodiments, the signature is defined at least based on the application space, the centroid, and the standard deviation.

Generally speaking, a server $p_i$ associated with the server feature matrix $A(p_i)(T_w)$ may be running a specific application represented as $a_i$. In one or more embodiments, the application space of the server $p_i$ formed from $A(p_i)(T_w)$ is said to be associated with the application $a_i$ and is represented as $(a_i)=\{\theta_1, \theta_2, \ldots, \theta_K\}(a_i)$ where $\sigma_1, \sigma_2, \ldots, \sigma_K$ are K principal components or basis (i.e., the first K columns in matrix V) determined as described in reference to Step 203 above.

In one or more embodiments, the centroid $\xi(a_i)$ of the application space $(a_i)$ is computed using feature vectors of all M flows in the originating server feature matrix $A(p_i)(T_w)$ projected in the application space $(a_i)$.

In one or more embodiments, the factor $\psi(a_i)$ is computed that specifies the radius of the hyper-sphere centered at the centroid $\xi(a_i)$ that encompass the feasibility region for all the flows that belong to the particular application $a_1$. The feasibility region is defined as a region that contains all the flows that belong to the application. For example, the radius of this hyper-sphere may be defined as a multiple of the standard deviation of the distances of each of the flows (used for signature extraction, e.g., form the originating server feature matrix) from the centroid in the application space.

In one or more embodiments, the mean of a statistical feature column in the originating server feature matrix may be represented as $\mu_k(a_i)$ for each $k \in \{1 \ldots S\}$ while the standard deviation of the statistical feature column in the originating server feature matrix may be represented as $\sigma_k(a_i)$ for each $k \in \{1 \ldots S\}$.

In one or more embodiments, the label $l(a_i)$ for the application may be identified by the server profiler as discussed above.

In one or more embodiments, the signature of the specific application running on a server $p_i$ (e.g., $a_1$ running on the first server P1) is defined based on $(a_i)$, $\xi(a_i)$, $\psi(a_i)$, $\mu_k(a_i)$, $\sigma_k(a_i)$, and $l(a_i)$.

As discussed above, each flow is represented by a unique S-dimensional feature vector. Generally speaking, all flows belonging to the same application can be projected into a K-dimensional application space which capture the similarity across all these flows where K<S and the value of K may be different for different applications. Flows belonging to the same application typically are placed in proximity to each other in this K-dimensional application space.

In one or more embodiments, flow-feature signature classification is performed using similarity search techniques in this K-dimensional application space. For example, application spaces for a set of applications $A=\{a_1, a_2, \ldots, a_O\}$ may be defined with each application $a_i$, $i \in \{1 \ldots o\}$ and associated application signature represented by a 6-tuple $((a_i), \xi(a_i), \psi(a_i), \mu_k(a_i), \sigma_k(a_i), l(a_i))$ to be used by the similarity search techniques described below. For example, the application signatures defined in such manner may be stored in the signature library (131) of FIG. 1 as the flow-feature signatures (132a, 132b, etc.) while the set of applications $A=\{a_1, a_2, \ldots, a_O\}$ may correspond to the server tags (133a, 133b, etc.) as described in reference to FIG. 1 above.

In Step 205, the application signatures are stored in the signature library and are updated, for example using the distiller described in reference to FIG. 1 above to accomplish four main tasks in a periodic fashion, i.e., every $T_w$. First, the distiller expires signatures characterized by long inactivity time, i.e., the last time a traffic stream matching those signatures was processed by the system exceeded a pre-specified internal threshold $\gamma$. This task is referred to as signature-expiration process. Second, for the remainder signatures in the list, the distiller provides an indicator that reflects the overall quality of the signatures present in the signature list such as to alert the system of situations in which distinct signatures may look similar. This second task is referred to as signature-list quality estimation process. Third, distiller decides whether a new signature can be appropriately added to the signature list without compromising the quality of the current signature list. A set of signatures is said to be of good quality if the signatures constituting the set are dissimilar from each other. This task is referred to as signature-specific quality estimation process. Fourth, the distiller is responsible to optimize the signature list by deciding which signatures can be consolidated, i.e., appending more than one signature to the same application. From now on, a stream X will be reported as belonging to application $a_i$ if the signatures of the stream matches any of the signatures associated to application $a_i$, i.e., OR operations across all the signatures of application $a_i$. This task is referred to as signature-list consolidation process.

In one or more embodiments, a dissimilarity metric between two flow-feature signatures $Z_x=(_x, \xi_x, \psi_x, \mu_x, \sigma_x)$ and $Z_y=(_y, \xi_y, \psi_y, \mu_y, \sigma_y)$ may be defined base on a Euclidean distance in a reference application space by ignoring the application label in the 6-tuples for the flow-feature signatures. For example, the application $a_x$ characterized by its signature $Z_x=(_x, \xi_x, \psi_x, \mu_x, \sigma_x)$ may be considered as reference space, i.e., $Z_{ref}=(_{ref}, \xi_{ref}, \psi_{ref}, \mu_{ref}, \sigma_{ref})=(_x, \xi_x, \psi_x, \mu_x, \sigma_x)$. In one or more embodiments, the signature $Z_y$ is projected into the reference space $Z_{ref}$ and the dissimilarity metric between $Z_x$ and $Z_y$ is defined as the Euclidean distance of the two centroids $\xi_y$ and $\xi_{ref}$ computed in the reference space $_{ref}$. More generally, let $Z(T_w)$ represents the list of all flow-feature signatures stored in the signature library up to time $T_w$, the dissimilarity metric $D(Z(T_w),T_w)$ is computed by (i) first electing a reference application space, (ii) projecting all signatures into the reference application space, and (iii) computing the Euclidean distance between centroids of all pair-wise combinations of signatures in such reference space, i.e., $\forall (z_i, z_j) \in Z(T_i)$. Accordingly, such dissimilarity metric may be used in the tasks performed by the distiller described above.

Regarding FIG. 2B, in Step 211, a second set of statistical features may be extracted from a second set of packet header records to form a second server feature matrix of the second server. For example, the second set of statistical features may be extracted and the second server feature matrix may be formed in substantially the same manner as described in reference to FIG. 2A above. In addition, the second set of packet header records may be obtained from a flow X to be classified while the second set of statistical features associated with the flow X is in the form of a feature vector with a dimension S (i.e., $\{x_k\}$ with $k \in \{1 \ldots S\}$.

In Step 212, second set of statistical features may be placed in an application space for comparing to a signature to generate a matching level. For example, the application space may be an application space $(a_i)$ associated with an application $a_i$ in the set of applications $A=\{a_1, a_2, \ldots, a_O\}$ as described in reference to FIG. 2A above. The second set of statistical features placed in this application space $(a_i)$ may be the feature vectors $\{x_k\}$ extracted in Step 211 above representing the flow X attached to the second server.

In one or more embodiments, the feature vector $\{x_k\}$ associated with the flow X is placed in the application space $(a_i)$ by first being normalized based on $\mu_k(a_i)$ and $\sigma_k(a_i)$ of the application space $(a_i)$ into a normalized feature vector $X(a_i)=\{(x_k-\mu_k(a_i)/\sigma_k(a_i)\}$. Once normalized, $X(a_i)$ is placed into the application space $(a_i)$. In one or more embodiments, $X(a_i)$ is into all application spaces associated with each application $a_i$ in the set of applications $A=\{a_1, a_2, \ldots, a_O\}$ to compare with the flow-feature signatures defined by the 6-tuple $((a_i), \xi(a_i), \psi(a_i), \mu_k(a_i), \sigma_k(a_i), l(a_i))$.

In one or more embodiments, matching level is generated in each application space, where $X(a_i)$ is placed, based on an Euclidean distance between the projected feature vector $X(a_i)$ of the flow X and the centroid $\xi(a_i)$ of the application space $(a_i)$, which is computed for each application space $a_i$ as $$\Delta(X(a_i), \xi(a_i)) = \frac{1}{D(a_i)} \sqrt{\sum_{h=1}^{D(a_i)} (X_h(a_i) - \xi_h(a_i))^2} .$$

Generally speaking, a smaller the Euclidean distance Euclidean distance corresponds to a higher matching level, and vice versa.

In Step 214, a decision is made as to whether the matching level exceeds a pre-determined criterion. For example, the pre-determined criterion is exceeded if $\Delta(X(a_i),\xi(a_i))<\psi(a_i)$ in which case the method proceeds to Step 215 where the flow X and the second server is tagged with the application $a_i$, i.e., flow X is determined to be generated by the application $a_i$ and the second server is determined to be running the application $a_i$. Accordingly, the networks and flows therein may be managed based on such determination.

If the decision is that the pre-determined criterion is not exceeded, the method proceeds to Step 216 where another decision is made as to whether there remain other signatures in other application spaces associated with the set of applications $A=\{a_1, a_2, \ldots, a_O\}$ with which the feature vector $\{x_k\}$ may be compared for determining matching levels. If the decision is yes, then the method returns to Step 212. If the decision is no, then the second server is determined to be running an unknown application. In one or more embodiments, additional flows X's attached with the second server may be obtained to form a second server feature matrix and generate a new signature using substantially the same method described in reference to FIG. 2A above. In one or more embodiments, the second server and the new signature are tagged with an application identified, for example using the server profiler described in reference to FIG. 1 above. According, the application is added to the set of applications $A=\{a_1, a_2, \ldots, a_O\}$ and the new signature is added to the signature library, for example (131) of FIG. 1.

In one or more embodiments, the pre-determined criterion used in Step 214 may require that the application space with minimum Euclidean distance is elected as the potential application match. In such embodiments, the method may loops through Steps 212, 214, 216 until the application space with minimum Euclidean distance is identified before proceeding to the Step 215.

In one or more embodiments, the method of FIG. 2A may be performed concurrently with the method of FIG. 2B in each time window in a sequence. For example, the method of FIG. 2B may be performed in time window $T_w$ based on signatures and application spaces generated by the method of FIG. 2A during a previous time window (e.g., $T_{w-1}$) while the method of FIG. 2A may be generating new signatures and new application spaces in time window $T_w$ to be used by the method of FIG. 2B during a subsequent time window (e.g., $T_{w+1}$).

FIGS. 3A-3D show examples according to aspects of the invention. In particular, FIGS. 3A-3D illustrate automated signature extraction and classification using the system (100) and corresponding methods described in reference to FIGS. 1, 2A, and 2B above. Assuming that initially there is no signature in the signature library. Hence any flow that is observed/received by the classifier is flagged as an "unknown" stream and is forwarded to the statistical analyzer, which identifies the top P servers in the current time interval, $T_w$, and forwards a list of the top P servers to the server profiler as well as forwards the set of server feature matrices for the top P servers to the signature generator. For illustration purposes, P=3 is used for the example below. In addition, each of the three servers are assumed to be associated with different applications, for example, GTALK® (a registered trademark of Google, Inc., Mountain View, Calif.), MSN® (a registered trademark of Microsoft Corporation, Redmond, Wash.), and FTP (File Transfer Protocol). Finally, it is assume that the server profiler has identified these three servers associated with the above applications and sends the labels to the signature generator.

The signature generator receives the labels from the server profiler and receives the three server feature matrices from the statistical analyzer. These matrices are shown in the Tables 1, 2, and 3 below. Specifically, each row in the table represents a feature vector and each column represents a statistical feature column.

TABLE 1

$A(p_i)(T_w)$ matrix for GTALK. S = 7 features from GTALK flows with packet headers only used for signature extraction.

| Avg Pkt Size (C) | Avg Pkt Size (S) | Avg Pkt IAT (C) | Avg Pkt IAT (S) | Avg bps (C) | Avg bps (S) | Avg Flow Duration |
|---|---|---|---|---|---|---|
| 138.5913 | 141.8291 | 30.3597 | 29.2268 | 5.0410 | 5.5849 | 118.0057 |
| 138.2769 | 143.6982 | 29.7287 | 29.6330 | 5.5667 | 5.3394 | 97.6629 |
| 138.0215 | 139.1715 | 30.1557 | 29.5522 | 5.4809 | 5.4972 | 155.0982 |
| 141.3808 | 140.9006 | 30.8760 | 29.6254 | 5.5346 | 5.6735 | 138.4500 |
| 140.7387 | 142.3404 | 30.2400 | 30.2651 | 5.4507 | 5.5653 | 142.4875 |
| 139.7825 | 139.8621 | 30.2992 | 30.1303 | 5.4943 | 5.4164 | 162.5475 |
| 138.3688 | 141.0592 | 30.3492 | 29.6930 | 5.8743 | 5.3913 | 192.4354 |
| 140.4957 | 139.6552 | 29.9563 | 29.6493 | 5.4952 | 5.6360 | 314.3423 |
| 140.1146 | 142.2512 | 29.8858 | 29.6101 | 5.3407 | 5.3757 | 224.7598 |
| 138.1303 | 139.8276 | 29.6692 | 29.1740 | 5.5554 | 5.3112 | 261.7462 |

TABLE 2

$A(p_i)(T_w)$ matrix for MSN. S = 7 features from MSN flows with packet headers only used for signature extraction.

| Avg Pkt Size (C) | Avg Pkt Size (S) | Avg Pkt IAT (C) | Avg Pkt IAT (S) | Avg bps (C) | Avg bps (S) | Avg Flow Duration |
|---|---|---|---|---|---|---|
| 112.1649 | 113.7986 | 20.2092 | 20.4254 | 5.8426 | 5.7258 | 248.3308 |
| 112.0448 | 112.0676 | 20.0964 | 20.0888 | 6.0915 | 6.2646 | 241.6642 |
| 111.1742 | 112.9522 | 19.8832 | 19.8041 | 6.0276 | 6.0164 | 141.8472 |
| 113.1088 | 113.2669 | 20.1077 | 19.8980 | 5.6827 | 5.8534 | 139.2977 |
| 112.5969 | 113.2779 | 20.4268 | 19.9994 | 5.9785 | 5.9388 | 117.0567 |
| 112.9758 | 112.3499 | 20.1079 | 20.1750 | 5.6998 | 6.2084 | 122.0540 |
| 111.6532 | 111.6610 | 19.9381 | 19.6956 | 6.1984 | 5.8529 | 249.1004 |
| 114.7196 | 112.8318 | 19.9215 | 20.1152 | 5.7261 | 6.0147 | 180.8869 |
| 112.3109 | 111.7267 | 19.8019 | 19.9900 | 6.1726 | 5.9321 | 77.4024 |
| 113.0192 | 113.7279 | 19.7911 | 19.4314 | 6.2392 | 6.0184 | 45.5950 |

TABLE 3

$A(p_i)(T_w)$ matrix for FTP. S = 7 features from FTP flows with packet headers only used for signature extraction.

| Avg Pkt Size (C) | Avg Pkt Size (S) | Avg Pkt IAT (C) | Avg Pkt IAT (S) | Avg bps (C) | Avg bps (S) | Avg Flow Duration |
|---|---|---|---|---|---|---|
| $0.0639 \times 10^3$ | $1.4585 \times 10^3$ | $0.1655 \times 10^3$ | $0.0921 \times 10^3$ | $0.0020 \times 10^3$ | $0.0298 \times 10^3$ | $1.6787 \times 10^3$ |
| $0.0639 \times 10^3$ | $1.4355 \times 10^3$ | $0.2437 \times 10^3$ | $0.1260 \times 10^3$ | $0.0022 \times 10^3$ | $0.0306 \times 10^3$ | $1.8063 \times 10^3$ |
| $0.0641 \times 10^3$ | $1.3997 \times 10^3$ | $0.2846 \times 10^3$ | $0.1527 \times 10^3$ | $0.0021 \times 10^3$ | $0.0357 \times 10^3$ | $1.8968 \times 10^3$ |
| $0.0640 \times 10^3$ | $1.3653 \times 10^3$ | $0.2007 \times 10^3$ | $0.0668 \times 10^3$ | $0.0022 \times 10^3$ | $0.0292 \times 10^3$ | $1.6242 \times 10^3$ |
| $0.0639 \times 10^3$ | $1.4447 \times 10^3$ | $0.2269 \times 10^3$ | $0.1267 \times 10^3$ | $0.0021 \times 10^3$ | $0.0295 \times 10^3$ | $2.1714 \times 10^3$ |
| $0.0640 \times 10^3$ | $1.4402 \times 10^3$ | $0.0966 \times 10^3$ | $0.1052 \times 10^3$ | $0.0020 \times 10^3$ | $0.0263 \times 10^3$ | $1.2883 \times 10^3$ |
| $0.0638 \times 10^3$ | $1.3974 \times 10^3$ | $0.1948 \times 10^3$ | $0.0643 \times 10^3$ | $0.0019 \times 10^3$ | $0.0347 \times 10^3$ | $1.7562 \times 10^3$ |
| $0.0640 \times 10^3$ | $1.4453 \times 10^3$ | $0.2875 \times 10^3$ | $0.0665 \times 10^3$ | $0.0022 \times 10^3$ | $0.0308 \times 10^3$ | $1.7321 \times 10^3$ |
| $0.0642 \times 10^3$ | $1.4333 \times 10^3$ | $0.1792 \times 10^3$ | $0.0921 \times 10^3$ | $0.0019 \times 10^3$ | $0.0255 \times 10^3$ | $1.9720 \times 10^3$ |
| $0.0640 \times 10^3$ | $1.2593 \times 10^3$ | $0.1910 \times 10^3$ | $0.1173 \times 10^3$ | $0.0021 \times 10^3$ | $0.0292 \times 10^3$ | $1.6604 \times 10^3$ |

These three matrices are then normalized and factorized using the SVD method. The first three principal components (PCs) for the three matrices that result from this factorization are shown in Tables 4, 5, and 6 below.

TABLE 4

First three principal components forming the GTALK application space, (GTALK).

| Feature Name | PC-1 | PC-2 | PC-3 |
|---|---|---|---|
| Avg Pkt Size (Client to Server) | 0.51 | −0.18 | 0.13 |
| Avg Pkt Size (Server to Client) | 0.02 | 0.66 | 0.12 |
| Avg Pkt IAT (Client to Server) | 0.53 | −0.01 | −0.03 |
| Avg Pkt IAT (Server to Client) | 0.33 | 0.06 | 0.63 |
| Avg bps (Client to Server) | −0.14 | −0.23 | 0.68 |
| Avg bps (Server to Client) | 0.54 | −0.18 | −0.31 |
| Avg Flow Duration | −0.19 | −0.66 | −0.01 |

TABLE 5

First three principal components forming the MSN application space, (MSN).

| Feature Name | PC-1 | PC-2 | PC-3 |
|---|---|---|---|
| Avg Pkt Size (Client to Server) | 0.24 | −0.55 | 0.33 |
| Avg Pkt Size (Server to Client) | 0.25 | −0.45 | −0.50 |
| Avg Pkt IAT (Client to Server) | 0.47 | 0.15 | −0.15 |
| Avg Pkt IAT (Server to Client) | 0.52 | 0.25 | 0.18 |
| Avg bps (Client to Server) | −0.54 | 0.21 | −0.21 |
| Avg bps (Server to Client) | −0.13 | −0.01 | 0.73 |
| Avg Flow Duration | 0.26 | 0.60 | −0.02 |

TABLE 6

First three principal components forming the FTP application space, (FTP).

| Feature Name | PC-1 | PC-2 | PC-3 |
|---|---|---|---|
| Avg Pkt Size (Client to Server) | 0.14 | 0.73 | −0.04 |
| Avg Pkt Size (Servet to Client) | 0.00 | −0.11 | 0.86 |
| Avg Pkt IAT (Client to Server) | 0.60 | 0.04 | −0.01 |
| Avg Pkt IAT (Server to Client) | 0.26 | 0.52 | −0.05 |
| Avg bps (Client to Server) | 0.42 | 0.0 | −0.24 |
| Avg bps (Server to Client) | 0.44 | −0.35 | −0.15 |
| Avg Flow Duration | 0.43 | 0.24 | 0.42 |

The values in these tables 4, 5, and 6 show the mapping between the original feature space in the normalized matrix and the principal components. For example, in Table 4, PC-1=0.51*Avg Pkt Size (Client to Server)+0.02*Avg Pkt Size (Server to Client)+0.53*Avg Pkt IAT (Client to Server)+ 0.33*Avg IAT Size (Server to Client)−0.14*Avg bps (Client to Server)+0.54*Avg bps (Server to Client)−0.19*Avg flow duration where it can be seen that the features "average packet size", "average packet IAT", and "average bps" have high coefficient values indicating that these features in the original space contribute significantly to the first principal component in the application space.

Figure 3A:
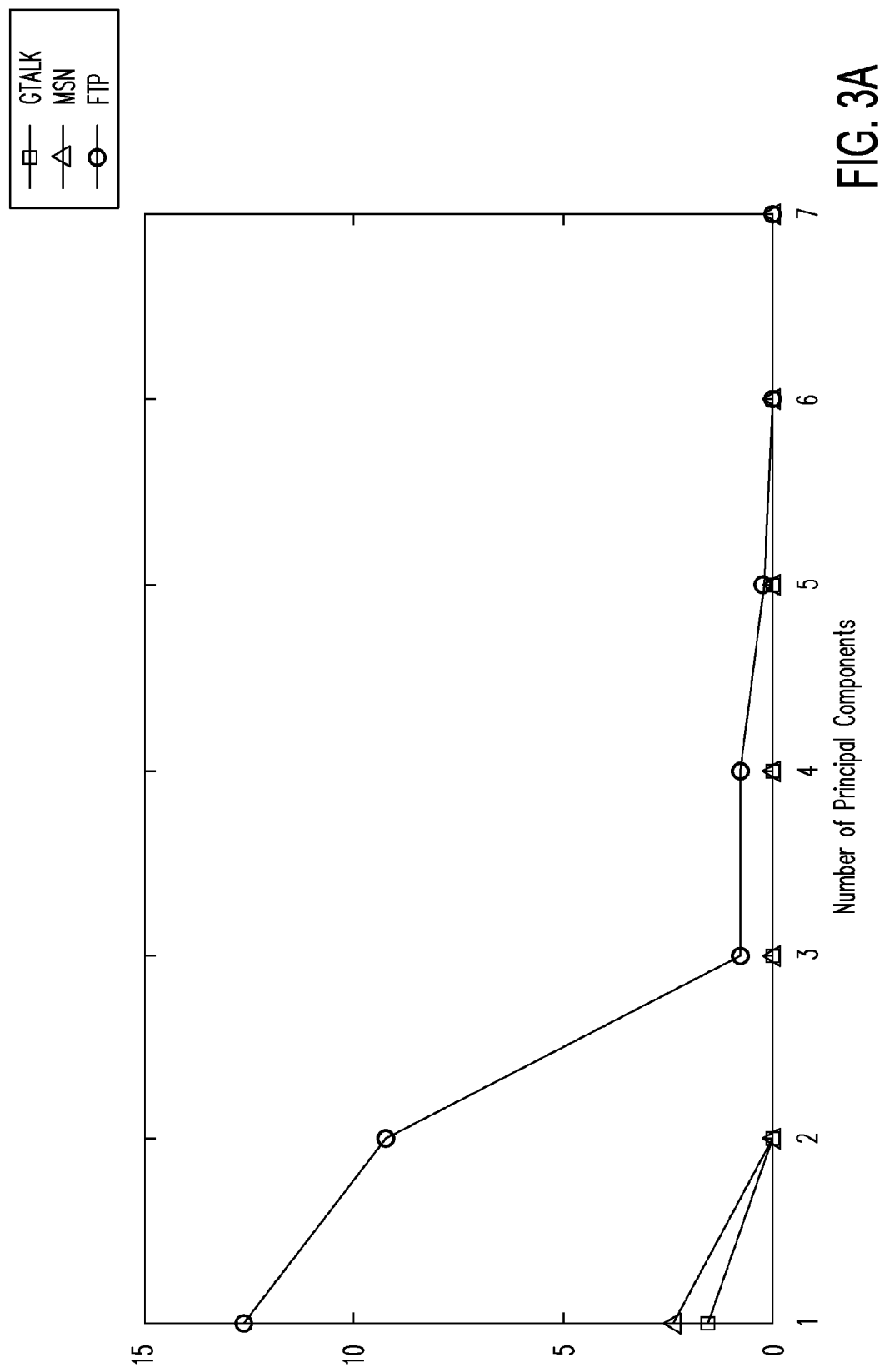
FIGS. 3A-3D show an example according to aspects of the invention.

FIG. 3A shows the percentage of energy captured by reconstructing the original matrix using first K principal components. The vertical axis represents the energy left not captured while the horizontal axis represents the number of principal components used in reconstructing the original matrix. It can be seen that using two principal components for GTALK and MSN result in more than 99% of the energy of the original matrix being captured in the reconstructed matrix. However for FTP, five principal components are required to capture more than 99% of the energy. For illustration, only three principal components are used in FIGS. 3B-3D below.

Figure 3B:
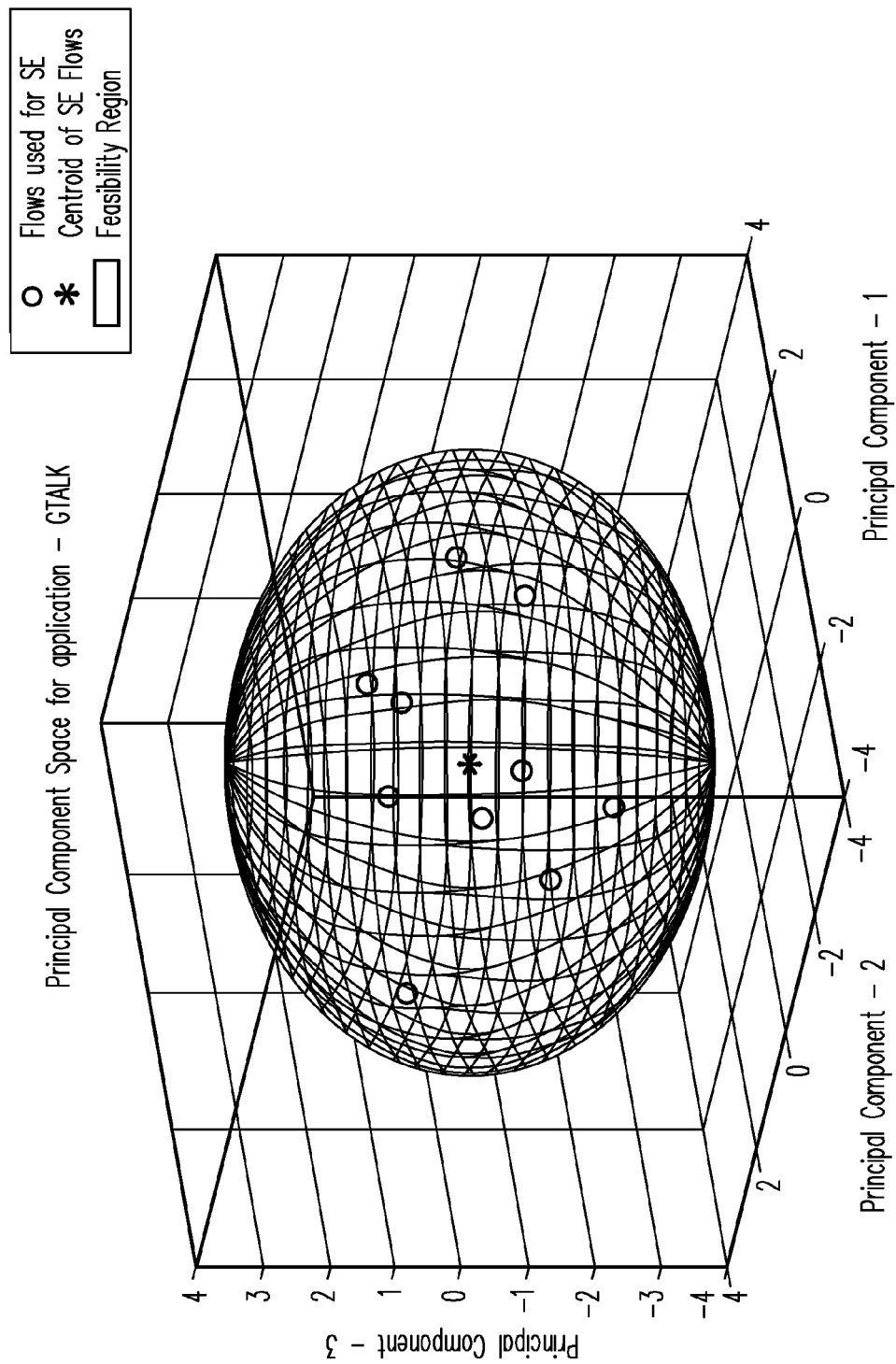
Figure 3C:
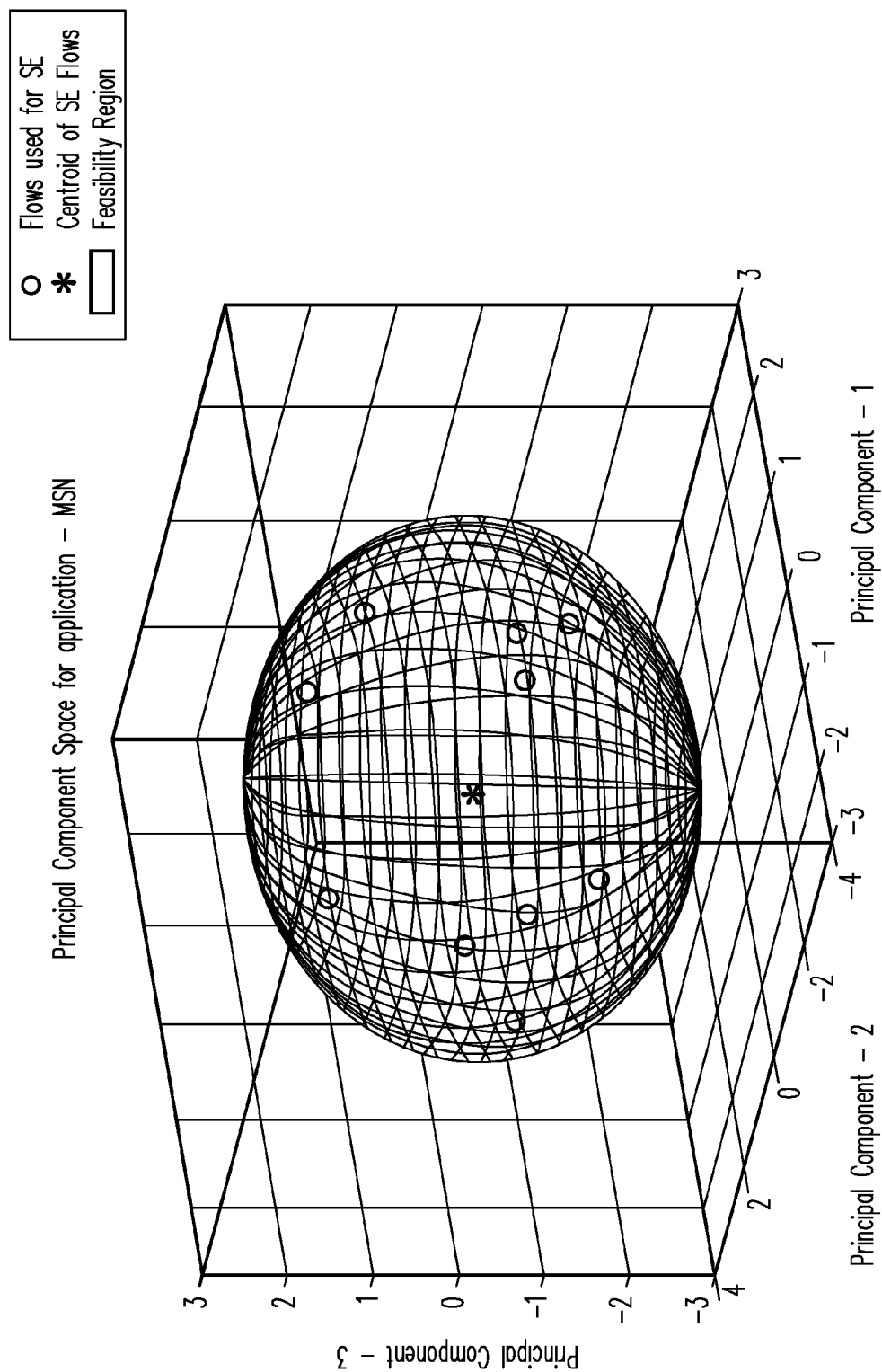
Figure 3D:
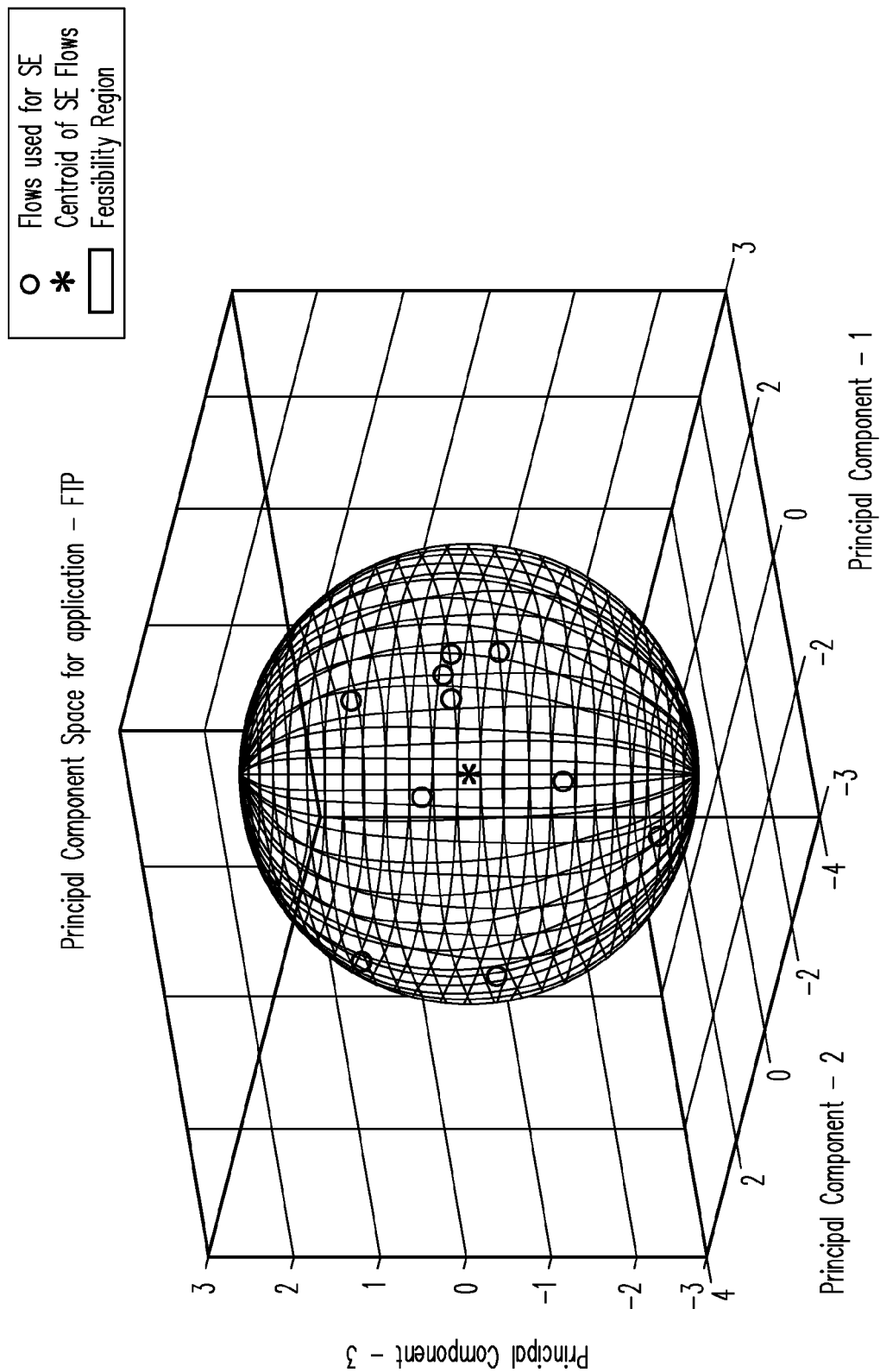

FIGS. 3B-3D show the application spaces ($a_i$) for all three applications $a_i$ considered in this example, namely GTALK, MSN, and FTP. In FIGS. 3B-3D, the scattered circles bounded by hyper-spheres represent the flows (i.e., the flow features) placed into these application spaces. Each hyper-sphere denotes the feasibility regions for all flows that belong to that application. The centroid $\xi(a_i)$ is denoted by a solid point in each of the three hyper-spheres. The radius of the hyper-sphere for application $a_i$ is $\psi(a_i)$ and is computed such that all the flows used for signature extraction lie inside the feasibility region. Note that the radius of this hyper-sphere is different for different applications. In the example, $\psi(a_i)=4*\omega(a_i)$, where $\omega(a_i)$ is the standard deviation of the distances of flows belonging to application $a_i$ used for signature extraction from the centroid $\psi(a_i)$. The 6-tuple (($a_i$), $\xi(a_i)$, $\psi(a_i)$, $\mu_k(a_i)$, $\sigma_k(a_i)$, $l(a_i)$)) for each $a_i \in$ {GTALK, MSN, FTP} computed in the above manner are stored as the signature for the three applications.

After the 6-tuple signatures are extracted and stored in a database (i.e., the signature library). For the purpose of illustration, assuming that the classifier receives three flows that now have to be examined against the signatures in the database. In this illustration, the first flow (Test Flow-1) is a GTALK flow, the second flow (Test Flow-2) is a MSN flow, and the third one (Test Flow-3) is a FTP flow. As soon as the classifier receives a test flow it computes all the S statistical features for that flow and stores it as a vector X. It then normalizes and projects this flow on to all the application spaces in the database. The normalization is carried out as $$X^n=(X-\mu(a_i))/\sigma(a_i) \text{ for each } a_i \in \{GTALK, MSN, FTP\}.$$

The test flow is then placed in the application space as $$X(a_i)=X^{n}*(a_i) \text{ for each } a_i \in \{GTALK, MSN, FTP\}$$

where $X^n$ is a 1*S vector, ($a_i$) is a S*K($a_i$) matrix (where K($a_i$) is the number of principal components being used for application space ($a_i$)), and X($a_i$) is a 1*K($a_i$) vector. $X^n$ ($a_i$) is a K($a_i$) dimensional vector that represents the projection in the K($a_i$)-dimensional application space of application $a_i$. Once $X^n$ is projected in the application space, the distance of the test flow from the centroid $\xi(ai)$ is computed as the Euclidean distance in a K(ai)-dimensional space.

With the three test flows placed in all the three application spaces in the database, it will be seen that when flows belonging to one application are projected (i.e., placed) in an application space associated with another application, the distance between the centroid and the flow is very large. The projected flow will lie outside the feasibility region. However, when flows belonging to one application are projected (i.e., placed) in the application space associated with the same application, the flows will get projected inside the feasibility region.

Although specific formats or structures are used as examples in the foregoing description regarding the flows, the informational block, the feature vectors, the server feature matrix, the principal components, etc., one skilled in the art, with the benefit of this disclosure, will recognize that other formats or structures may also be used in the system and methods described without deviating from the spirit of the invention.

Figure 4:
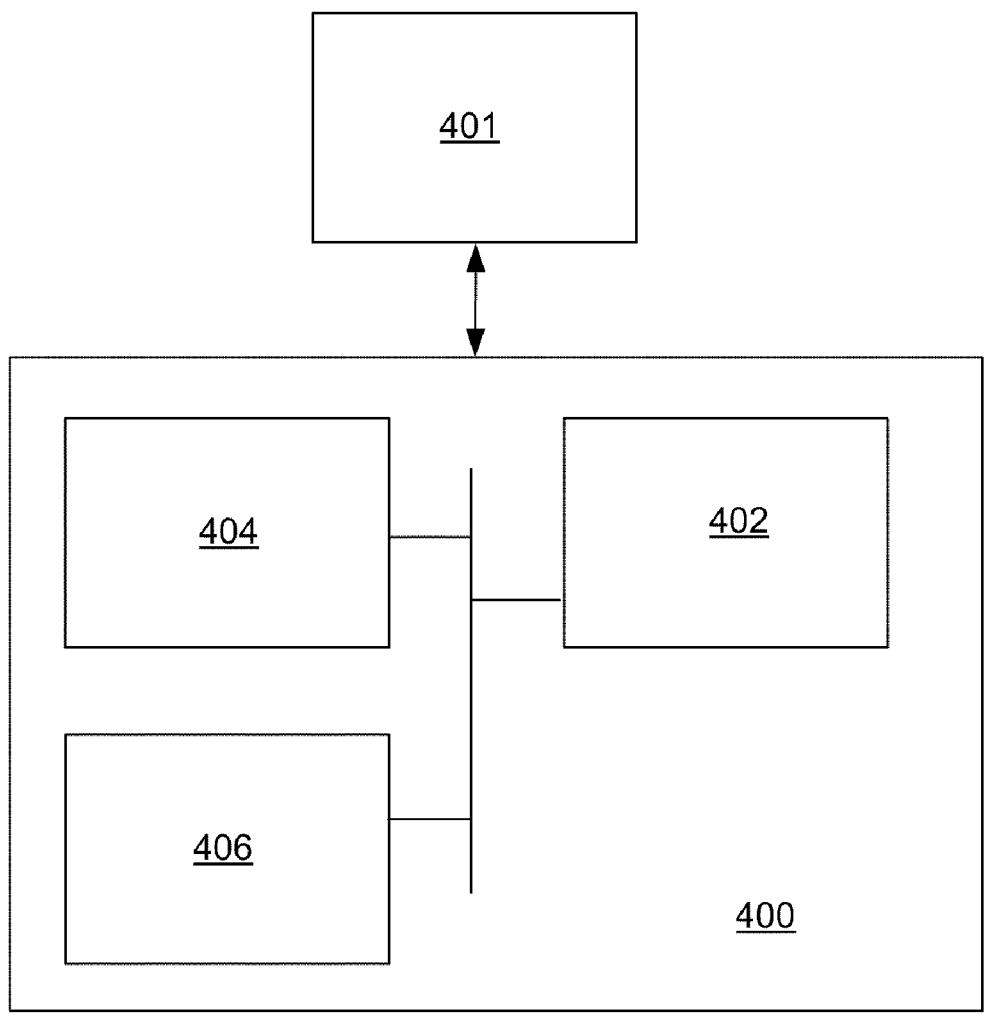
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for profiling network traffic of a network, comprising:
   obtaining a first plurality of packet header records from a plurality of flows in the network traffic;
   extracting a first plurality of statistical features for each flow from the first plurality of packet header records to form a first server feature matrix of a first server associated with the first plurality of packet header records;
   determining, using a computer, a plurality of principal components of the first server feature matrix by factorizing the first server feature matrix;
   forming an application space based on the plurality of principal components, wherein the plurality of principal components are orthogonal unit vectors in the application space;
   identifying, using the computer, a signature of the first server based on a pattern of the first plurality of packet header records in the application space, wherein the signature is associated with a network application running on the first server; and
   determining, using the computer, a second server in the network as running the network application by:
      extracting a second plurality of statistical features from a second plurality of packet header records associated with the second server in the network traffic;
      placing the second plurality of statistical features in the application space for comparing to the signature to generate a matching level; and
      determining the second server as running the network application when the matching level exceeds a pre-determined criterion.

2. The method of claim 1, wherein obtaining the first plurality of packet header records from the network traffic comprises:
   obtaining a plurality of data packets from the network traffic;
   identifying an IP address of which percentage occurrences in destination IP address fields in the plurality of data packets exceeds a pre-determined threshold;
   identifying an end point of the network associated with the IP address as the first server; and
   extracting the first plurality of packet header records from the plurality of data packets based on the IP address of the first server.

3. The method of claim 2, further comprising:
   collecting the plurality of data packets in the network traffic during a first time window, wherein the signature of the first server and the network application are identified during the first time window;
   collecting another plurality of data packets in the network traffic during a second time window subsequent to the first time window; and
   identifying the second server by analyzing the another plurality of data packets during the second time window, wherein the second server is not identified from the plurality of data packets during the first time window.

4. The method of claim 1, further comprising:
   placing entries of the first server feature matrix in the application space to form the pattern of the first plurality of packet header records; and
   determining a centroid and a standard deviation of the entries of the first server feature matrix in the application space,
   wherein the signature is defined based on the application space, the centroid, and the standard deviation.

5. The method of claim 1, further comprising:
   identifying a portion of the plurality of principal components by which the first server feature matrix is reconstructed within a pre-determined threshold of deviation;
   wherein the application space is formed using the portion of the plurality of principal components.

6. The method of claim 1, wherein the first plurality of statistical features comprises at least one of average client to server packet size, average server to client packet size, average client to server inter-packet arrival time, average server to client inter-packet arrival time, average client to server packet data rate, average server to client packet data rate, and average flow duration.

7. A non-transitory computer readable medium, embodying instructions when executed by the computer to profile network traffic of a network, the instructions comprising functionality for:
   obtaining a plurality of data packets from the network traffic;
   identifying an IP address of which percentage occurrences in destination IP address fields in the plurality of data packets exceeds a pre-determined threshold;

identifying an end point of the network associated with the IP address as a first server associated with a plurality of flows in the network traffic; and extracting a first plurality of packet header records from the plurality of data packets based on the IP address of the first server;

extracting a first plurality of statistical features for each flow from the first plurality of packet header records to form a first server feature matrix of the first server;

determining, using a computer, a plurality of principal components of the first server feature matrix by factorizing the first server feature matrix using singular value decomposition;

forming an application space based on the plurality of principal components, wherein the plurality of principal components are orthogonal unit vectors in the application space;

identifying, using the computer, a signature of the first server based on a pattern of the first plurality of packet header records in the application space, wherein the signature is associated with a network application running on the first server;

determining, using the computer, a second server in the network as running the network application by analyzing a second plurality of packet header records associated with the second server in the network traffic based on the signature.

8. The non-transitory computer readable medium of claim 7, the instructions when executed by the computer further comprising functionalities for:

placing entries of the first server feature matrix in the application space to form the pattern of the first plurality of packet header records; and determining a centroid and a standard deviation of the entries of the first server feature matrix in the application space, wherein the signature is defined based on the application space, the centroid, and the standard deviation.

9. The non-transitory computer readable medium of claim 7, the instructions when executed by the computer further comprising functionalities for:

identifying a portion of the plurality of principal components by which the first server feature matrix is reconstructed within a pre-determined threshold of deviation;

wherein the application space is formed using the portion of the plurality of principal components.

10. The non-transitory computer readable medium of claim 7, wherein analyzing the second plurality of packet header records in the network traffic based on the signature comprises:

extracting a second plurality of statistical features from the second plurality of packet header records;

placing the second plurality of statistical features in the application space for comparing to the signature to generate a matching level; and determining the second server as running the network application when the matching level exceeds a pre-determined criterion.

11. The non-transitory computer readable medium of claim 7, wherein the first plurality of statistical features comprises at least one of average client to server packet size, average server to client packet size, average client to server inter-packet arrival time, average server to client inter-packet arrival time, average client to server packet data rate, average server to client packet data rate, and average flow duration.

12. The non-transitory computer readable medium of claim 7, the instructions when executed by the computer further comprising functionalities for:

collecting the plurality of data packets in the network traffic during a first time window, wherein the signature of the first server and the network application are identified during the first time window;

collecting another plurality of data packets in the network traffic during a second time window subsequent to the first time window; and identifying the second server by analyzing the another plurality of data packets during the second time window, wherein the second server is not identified from the plurality of data packets during the first time window.

13. A system for profiling network traffic of a network, comprising:

a data collector configured to:

obtain a plurality of data packets from the network traffic;

identify an IP address of which percentage occurrences in destination IP address fields in the plurality of data packets exceeds a pre-determined threshold;

identify an end point of the network associated with the IP address as a first server associated with a plurality of flows in the network traffic; and extract a first plurality of packet header records from the plurality of data packets based on the IP address of the first server;

a statistical analyzer configured to:

extract a first plurality of statistical features for each flow from the first plurality of packet header records to form a first server feature matrix of the first server;

determine a plurality of principal components of the first server feature matrix by factorizing the first server feature matrix using singular value decomposition; and form an application space based on the plurality of principal components, wherein the plurality of principal components are orthogonal unit vectors in the application space;

a signature generator configured to identify a signature of the first server based on a pattern of the first plurality of packet header records in the application space, wherein the signature is associated with a network application running on the first server; and a processor and memory storing instructions when executed by the processor comprising functionalities to:

analyze a second plurality of packet header records in the network traffic based on the signature to generate a matching level; and determine a second server in the network as running the network application based on the matching level.

14. The system of claim 13, wherein the signature generator is further configured to:

place entries of the first server feature matrix in the application space to form the pattern of the first plurality of packet header records; and determine a centroid and a standard deviation of the entries of the first server feature matrix in the application space, wherein the signature is defined based on the application space, the centroid, and the standard deviation.

15. The system of claim 13, wherein the statistical analyzer is further configured to:

identify a portion of the plurality of principal components by which the first server feature matrix is reconstructed within a pre-determined threshold of deviation;

wherein the application space is formed using the portion of the plurality of principal components.

16. The system of claim 13, the instructions when executed by the processor further comprising functionalities to:
- extract a second plurality of statistical features from the second plurality of packet header records;
- place the second plurality of statistical features in the application space for comparing to the signature to generate the matching level; and
- determine the second server as running the network application when the matching level exceeds a pre-determined criterion.

17. The system of claim 13, wherein the first plurality of statistical features comprises at least one of average client to server packet size, average server to client packet size, average client to server inter-packet arrival time, average server to client inter-packet arrival time, average client to server packet data rate, average server to client packet data rate, and average flow duration.

18. The system of claim 13, wherein the data collector is further configured to:
- collect the plurality of data packets in the network traffic during a first time window, wherein the signature of the first server and the network application are identified during the first time window;
- collect another plurality of data packets in the network traffic during a second time window subsequent to the first time window; and
- identify the second server by analyzing the another plurality of data packets during the second time window, wherein the second server is not identified from the plurality of data packets during the first time window.

* * * * *